UNITED STATES PATENT OFFICE.

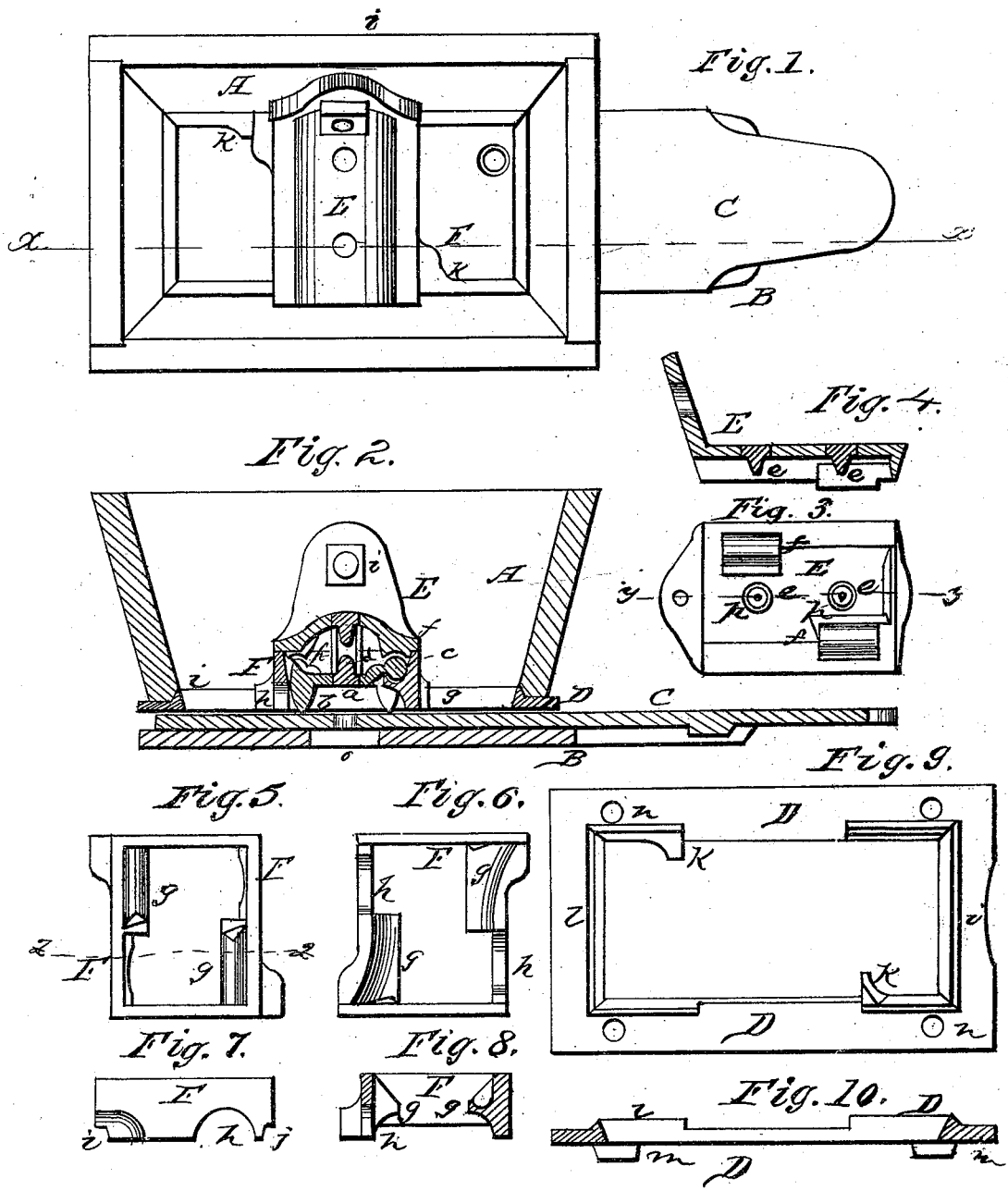

ALEXANDER HEARST, OF PEORIA, ILLINOIS.

IMPROVEMENT IN CORN-PLANTERS.

Specification forming part of Letters Patent No. 170,474, dated November 30, 1875; application filed September 7, 1875.

*To all whom it may concern:*

Be it known that I, ALEXANDER HEARST, of Peoria, Peoria county, State of Illinois, have invented new and useful Improvements in Seeding Devices for Corn-Planters, of which the following is a full description, reference being had to the accompanying drawings, in which—

Figure 1 is a top or plan view; Fig. 2, a vertical section on line $x\ x$ of Fig. 1; Fig. 3, a bottom view of the cap; Fig. 4, a section on line $y\ y$ of Fig. 3; Figs. 5 and 6, top and bottom view of the valve-frame; Fig. 7, a side view of the same; Fig. 8, a cross-section taken on line $z\ z$ of Fig. 5; Figs. 9 and 10, plan and section of the hopper-plate.

The seeding devices here shown are, in their general construction, similar to those patented to me December 8, 1874; and the nature of my invention consists in certain improvements, as hereinafter set forth and claimed as new.

In the drawings, A represents the seed hopper or box; B, the bed-plate; C, the seed-slide; D, the hopper-plate; E, the cap; F, the valve-frame; $a$, the valves; $b$, the head of the cut-off of the valve; $c$, the pivot; $d\ e$, corresponding pins on the valves $a$ and cap E; $f$, the upper bearings of the pivots; $g$, ledges or lower bearings of the pivots $c$; $h$, the opening through the valve-frame; $i$, the bolt and nut for attaching the seed-cap E to the hopper-box; $j$, the notches on the valve-frame for holding it in position on the hopper-plate D; $k$, the projections on the hopper-plate for holding the valve-frame in position and directing the seed to the opening $h$; $l$, the border or ledge on the hopper-plate for attaching it to the hopper-box A; $m$, the projections on the hopper-plate D, through which the screws $n$ pass, and by which the hopper and bed-plates are held together, so as to leave a space for the operation of the seed-slide $c$; $o$, the openings in the bed-plate, through which the seed passes; $p$, the rubber springs.

The box A is usually made of wood, while the rest of the device is made of cast-iron or other suitable metal. The valve-frame F is centrally located, and rests loosely on the plate D, between the projections $k$, and is held in place by said projections and the notches $j$ on its lower edge. It is provided with openings, $h$, through which the corn passes to the valves or cut-offs $a$. Opposite to each opening $h$ it is provided with a ledge, $g$, grooved out on its upper side to form a bearing for the end of the valve, as shown at Figs. 2 and 5. The valve $a$ is provided with a rounded end or pivot, $c$, which rests in the ledge $g$, and its front end is provided with a head or cut-off, $b$, which form leaves an open space beneath the cut-off, so that it will fall back into place immediately after the opening in the seed-slide or seed-cup has passed beneath it. The device is provided with two of these cut-offs $a$, working in opposite directions, and they rest loosely in the frame F until the cap E is applied, when the ledges or openings $f$ on the cap complete the journal-bearings and hold the cut-offs in place. On the top of each cut-off or valve $a$ is placed a pin or stud, $d$, and a corresponding pin or stud, $e$, is placed on the cap E, by means of which studs $d\ e$ a light spring, $p$, is secured in place, which spring may be made from rubber tubing or coiled wire, as may be desired, thus giving each valve a separate and independent action.

In operation the seed-slide C is reciprocated by any of the well-known methods. The corn is carried through the opening $h$ under the head $b$ of the valve $a$ into the opening under the valve, and over the opening $o$ through the bed-plate B, from which it passes to the ground through tubes or other devices attached to wheels of the furrow-openers. The head $b$ of the valve $a$ effectually closes the opening $h$, so that no grain passes within the frame F except such as is contained in the seed-cup or opening in the seed-slide C.

What I claim as new, and desire to secure by Letters Patent, is as follows:

1. The frame F, provided with the ledges $g$ and openings $h$, in combination with the cut-off valves $a$, constructed and operating substantially as set forth.

2. The combination of the frame F, provided with the ledges $g$ and cap E, provided with the opening $f$, with the valves $a$, substantially as specified.

3. The combination of the cap E, provided with the pins or studs e and valves a, provided with the pins or studs d, with the springs p, substantially as and for the purposes specified.

4. The combination and arrangement of the frame F, valves a, cap E, and springs p, with the box A, plate D, seed-slide C, and bed-plate B, all constructed and operating substantially as set forth.

ALEXANDER HEARST.

Witnesses:
  E. R. MANN,
  RICHARD HEARST.